S. N. PALMS.
ROCKER VALVE.
APPLICATION FILED FEB. 17, 1905.
947,844.
Patented Feb. 1, 1910.
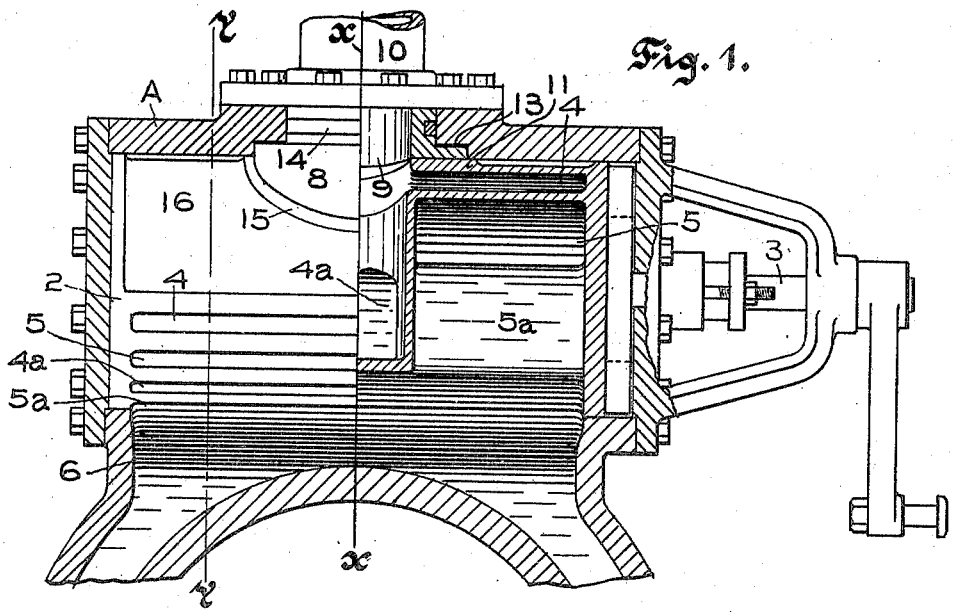
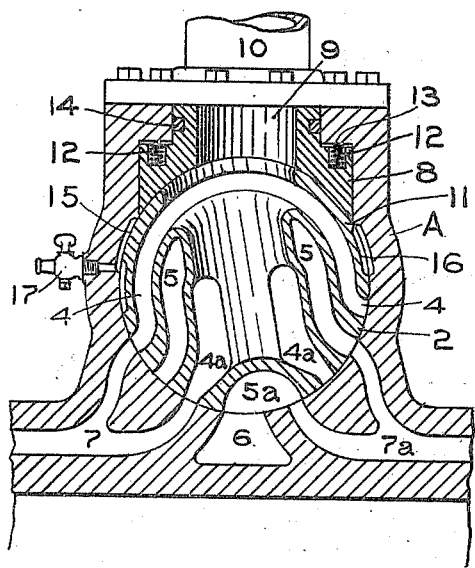
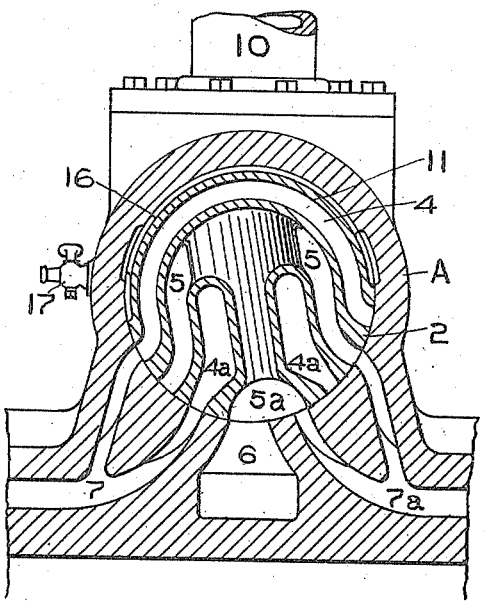
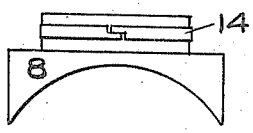
Witnesses,
W. H. Palmer.
Emily F. Otis
Inventor,
Squire N. Palms.
By Lothrop & Johnson
his Attorneys.

UNITED STATES PATENT OFFICE.

SQUIRE N. PALMS, OF HUDSON, WISCONSIN.

ROCKER-VALVE.

947,844.  Specification of Letters Patent.  Patented Feb. 1, 1910.

Application filed February 17, 1905. Serial No. 245,982.

*To all whom it may concern:*

Be it known that I, SQUIRE N. PALMS, a citizen of the United States, residing at Hudson, in the county of St. Croix and State of Wisconsin, have invented certain new and useful Improvements in Rocker-Valves, of which the following is a specification.

My invention relates to improvements in rocker valves, and has for its object particularly to provide a balanced rocker valve, and to provide means for preventing steam from getting on top of the valve thereby causing the valve to run hard.

To this end my invention consists in the features of construction and combination hereinafter particularly described and claimed.

In the accompanying drawings forming part of this specification, Figure 1 is a longitudinal vertical section of the valve casing and of one-half the valve, the other half of the valve being shown in elevation and illustrating the arrangement of the parts; Fig. 2 is a section on line $x$—$x$ of Fig. 1; Fig. 3 is a section on line $y$—$y$ of Fig. 1, and Fig. 4 is a detail of a bushing forming part of my invention.

In the drawings A represents a valve chest, inclosing the valve 2 driven by a shaft 3. As shown in the drawings the valve is of double ported construction, having inlet ports 4 and $4^a$ leading through the valve, and outlet ports 5 and $5^a$ connecting with the exhaust port 6. Passages 7 and $7^a$ lead from the valve chamber to the cylinder. Supported in the valve chest on top of the valve is the bushing 8 provided with a passage 9 which connects the inlet steam pipe 10 with the steam passages through the valve. The bushing is held against the outer wall 11 of the valve by means of the vertically arranged coil springs 12 fitted in the bushing and bearing against the inwardly extending upper wall 13 of the valve chest. A packing-ring 14 is fitted in and around the bushing to prevent steam from getting around the bushing to the outside of the valve. As shown in Fig. 1 the valve is formed with a turned surface 15 upon which the bushing rests making a steam-tight joint. The surface 16 of the valve around the turned part 15 is preferably cut away as shown so as to avoid friction. A relief cock 17 is tapped in the side wall of the valve chest to carry off any steam that may leak into the space around the valve.

By referring to Fig. 2 it will be seen that the bushing through which steam passes to enter the valve is in contact with the outer wall 11 in every position of the valve. Leakage of steam to the outside of the valve is thus prevented, the packing ring 14 also acting to prevent any steam passing to the top of the valve. The outer wall 11 of the valve, extending as it does into the concavity of the bushing, keeps the inflowing steam from coming against the wall of the valve chest, and thus practically confines the steam to the inside of the valve, thereby balancing the valve.

In operation, with the parts in the position shown in Fig. 2, steam will pass through the inlet pipe 10 through the bushing and through the left-hand passages 4 and $4^a$ of the valve into the cylinder through the passage 7. At the same time steam is exhausting from the opposite end of the cylinder through the passage $7^a$ and exhaust ports $5^a$ and 6. When the valve is reversed steam will pass oppositely through the ports.

Having now described my invention, what I claim as new, and desire to secure by Letters Patent, is:—

1. The combination with a cylinder and valve chest provided with inlet and exhaust ports, of a concave bushing supported in the upper side of said valve chest and formed with a steam passage, a rocker valve fitted within said chest provided with curved outer side walls constituting the outer walls of the inlet steam ports, said walls fitting closely within said valve chest and extending into the concavity of said bushing in all positions of the valve, a relatively raised portion upon the upper surface of the valve, springs holding the bushing against said raised surface, and inlet and exhaust ports extending through said valve.

2. The combination with a cylinder and supported valve chest provided with inlet and exhaust ports, a rocker valve supported in said valve chest, inlet steam passages extending through said valve in position to connect with the inlet ports of the cylinder, exhaust passages extending through the valve in position to connect the exhaust ports of the cylinder with the exhaust port of the valve chest, a raised portion upon the upper surface of the valve, a bushing supported in the valve chest, springs holding said bushing against said surface, a steam ring fitted in said bushing and bearing against the adjacent wall of the chest, and a passage extending through said bushing and connecting the inlet steam port of the chest with the steam passages through the valve.

In testimony whereof I affix my signature in presence of two witnesses.

SQUIRE N. PALMS.

Witnesses:
E. H. NAGEL,
H. P. SVENDSEN.